(12) United States Patent
Kim

(10) Patent No.: US 11,453,336 B2
(45) Date of Patent: Sep. 27, 2022

(54) REAR SIDE ALARM DEVICE OF VEHICLE AND METHOD THEREOF

(71) Applicant: MANDO MOBILITY SOLUTIONS CORPORATION, Gyeonggi-do (KR)

(72) Inventor: Dong Myeong Kim, Gyeonggi-do (KR)

(73) Assignee: MANDO MOBILITY SOLUTIONS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/176,600

(22) Filed: Feb. 16, 2021

(65) Prior Publication Data

US 2021/0300244 A1   Sep. 30, 2021

(30) Foreign Application Priority Data

Mar. 25, 2020   (KR) .......................... 10-2020-0035993

(51) Int. Cl.
*G08G 1/00*   (2006.01)
*B60R 1/00*   (2022.01)
(Continued)

(52) U.S. Cl.
CPC ................ *B60R 1/00* (2013.01); *G06V 20/56* (2022.01); *G08G 1/166* (2013.01); *G08G 1/167* (2013.01);
(Continued)

(58) Field of Classification Search
CPC ... B60R 1/00; B60R 2300/10; B60R 2300/20; B60R 2300/50; B60R 2300/8066;
(Continued)

(56) References Cited

U.S. PATENT DOCUMENTS

2012/0235805 A1* 9/2012 Nogami .................. G06T 7/215
340/441
2016/0252610 A1* 9/2016 Smith ..................... G01S 13/04
342/27

(Continued)

FOREIGN PATENT DOCUMENTS

JP          2017-47868        3/2017
KR     10-2012-0062215        6/2012
(Continued)

OTHER PUBLICATIONS

Office Action dated May 24, 2021 for Korean Patent Application No. 10-2020-0035993 and its English machine translation by Google Translate.

*Primary Examiner* — Hongmin Fan
(74) *Attorney, Agent, or Firm* — Ladas & Parry, LLP

(57) ABSTRACT

Rear side alarm device of vehicle and method thereof is provided. A vehicle rear side alarm device according to an embodiment of the present disclosure includes a sensor to detect a rear side of a host vehicle; a display to display a detected object; and a controller communicatively connected to the sensor and the display. Here, the controller is configured to: determine whether the object detected by the sensor is a two-wheeled vehicle; if the detected object is a two-wheeled vehicle, control to alarm the approach of the two-wheeled vehicle through a display; and expand a preset rear side alarm area to the side of the host vehicle so that the expanded alarm area partially overlaps a tail of the host vehicle.

14 Claims, 7 Drawing Sheets

(51) Int. Cl.
  *G08G 1/16* (2006.01)
  *H04N 7/18* (2006.01)
  *G06V 20/56* (2022.01)
  *G01S 13/931* (2020.01)

(52) U.S. Cl.
  CPC .......... *H04N 7/183* (2013.01); *B60R 2300/10* (2013.01); *B60R 2300/20* (2013.01); *B60R 2300/50* (2013.01); *B60R 2300/8066* (2013.01); *G01S 13/931* (2013.01); *G01S 2013/9323* (2020.01); *G01S 2013/93272* (2020.01); *G06V 2201/08* (2022.01)

(58) Field of Classification Search
  CPC ........ B60R 2001/1215; G06K 9/00791; G06K 2209/23; G08G 1/166; G08G 1/167; H04N 7/183; G01S 13/931; G01S 2013/9323; G01S 2013/93272; G01S 7/411; G01S 13/867; G01S 17/86; G01S 17/931; G01S 2013/93274
  See application file for complete search history.

(56) References Cited

U.S. PATENT DOCUMENTS

2018/0001819 A1* 1/2018 Imbe ................ B60R 1/00
2019/0088137 A1* 3/2019 Yamada ............. B60R 1/06

FOREIGN PATENT DOCUMENTS

| KR | 10-2019-0012052 | 2/2019 |
| KR | 10-2019-0043035 | 4/2019 |

* cited by examiner

REAR SIDE ALARM DEVICE OF VEHICLE AND METHOD THEREOF

CROSS-REFERENCE TO RELATED APPLICATION

This application claims priority to and the benefit of Korean Patent Application No. 10-2020-0035993, filed on Mar. 25, 2020, the disclosure of which is incorporated herein by reference in its entirety.

TECHNICAL FIELD

The present disclosure relates to a rear side alarm device of vehicle and method thereof.

BACKGROUND

Recently, as the installation of rear side alarm device in vehicles has increased, drivers can change lanes more safely. However, most of the current rear side alarm devices alarm based on four-wheeled vehicles on the road. Therefore, in the case of a two-wheeled vehicle such as a motorcycle that is relatively narrow and freely travels between vehicles, it may pose a threat to the vehicle driver at any time even if it is not present in the alarm area of the current rear side alarm device.

In the meantime, the current rear side alarm device provides the same alarm area for a four-wheeled vehicle or a two-wheeled vehicle. At this time, when the two-wheeled vehicle approaches the host vehicle lane, since it is out of the alarm area, it is excluded from the alarm target. Therefore, it is difficult for the host driver to recognize the approach of the two-wheeled vehicle because it does not alarm despite the approach of the two-wheeled vehicle.

In particular, in the case of a two-wheeled vehicle approaching by a host lane, since it is possible to approach and pass between the vehicle in the next lane and the host vehicle without changing the lane to the next lane, it is a target that requires prior recognition and alarm.

The above information disclosed in this Background section is only for enhancement of understanding of the background of the disclosure and it may therefore contain information that does not form the prior art that is already known to a person of ordinary skill in the art.

SUMMARY

One embodiment of the present disclosure is directed to providing a rear side alarm device of vehicle and method thereof capable of varying an alarm area according to the size of surrounding vehicles.

The technical problems to be solved in the present disclosure are not limited to the technical problems mentioned above, and other technical problems not mentioned will be clearly understood by those of ordinary skill in the art from the following description.

One aspect of the present disclosure is directed to providing a vehicle rear side alarm device, including a sensor to detect a rear side of a host vehicle; a display to display a detected object; and a controller communicatively connected to the sensor and the display and configured to: determine whether the object detected by the sensor is a two-wheeled vehicle; if the detected object is a two-wheeled vehicle, control to alarm the approach of the two-wheeled vehicle through a display; and expand a preset rear side alarm area to the side of the host vehicle so that the expanded alarm area partially overlaps a tail of the host vehicle.

In an embodiment, the controller may be configured to expand the preset rear side alarm area to an area detectable by the lidar sensor in a forward direction and a reverse direction of the host vehicle.

In an embodiment, the sensor may include at least one of a lidar sensor or a radar sensor, and the controller may be configured to determine an intensity or amount of a signal received from the lidar sensor or the radar sensor, and if the determined intensity or amount of the signal is less than a first threshold value, determine the detected object as a two-wheeled vehicle.

In an embodiment, the controller may be configured to determine a width of the detected object, and if the determined width of the object is less than a second threshold value, determine the detected object as a two-wheeled vehicle.

In an embodiment, the display may include at least one of a cluster display or a mirror indicator.

In an embodiment, if the detected object is a two-wheeled vehicle, the display may display a symbol corresponding to the two-wheeled vehicle.

In an embodiment, the sensor may include a camera for detecting rear side of the host vehicle. Here, the controller may be configured to detect an object from an image obtained by the camera and determine whether the detected object is a two-wheeled vehicle.

In an embodiment, if the detected object is a two-wheeled vehicle, the controller may control to display the image obtained by the camera on the display.

Another aspect of the present disclosure is directed to providing a vehicle rear side alarm method, including: detecting, by a sensor, rear side of a host vehicle; determining whether an object detected by the sensor is a two-wheeled vehicle; if the detected object is a two-wheeled vehicle, alarming the approach of the two-wheeled vehicle through a display; and expanding a preset rear side alarm area to the side of the host vehicle so that the expanded alarm area partially overlaps a tail of the host vehicle.

In an embodiment, the expanding may include expanding the preset rear side alarm area to an area detectable by the sensor in a forward direction and a reverse direction of the host vehicle.

In an embodiment, the detecting may be performed by one of a lidar sensor or a radar sensor, and the determining may include determining an intensity or amount of a signal received from the lidar sensor or the radar sensor; and if the determined intensity or amount of the object is less than a first threshold value, determining the detected object as a two-wheeled vehicle.

In an embodiment, the determining may include determining a width of the detected object, and if the determined width of the object is less than a second threshold value, determining the detected object as a two-wheeled vehicle.

In an embodiment, the alarming may include displaying on at least one of a cluster display or a mirror indicator.

In an embodiment, if the detected object is a two-wheeled vehicle, the alarming may include displaying a symbol corresponding to the two-wheeled vehicle.

In an embodiment, the detecting may include detecting rear side of the host vehicle by a camera. Here, the determining may include detecting an object from the image, and determining whether the detected object is a two-wheeled vehicle.

In an embodiment, the alarming may include displaying the image obtained by the camera on the display.

The rear side alarm device of vehicle and method thereof according to an embodiment of the present disclosure may perform an alarm for a two-wheeled vehicle running between the host vehicle and other vehicle in the next lane by expanding the alarm area to the rear of the host vehicle lane only when the two-wheeled vehicle is approaching, thereby improving the reliability of the alarm.

In addition, the present disclosure may reduce the possibility of a collision with a two-wheeled vehicle while driving to prevent a collision accident in advance by helping the driver to pre-recognize the existence of a two-wheeled vehicle that moves in relatively various paths on the road and is difficult to identify with the naked eyes.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Figure 1:
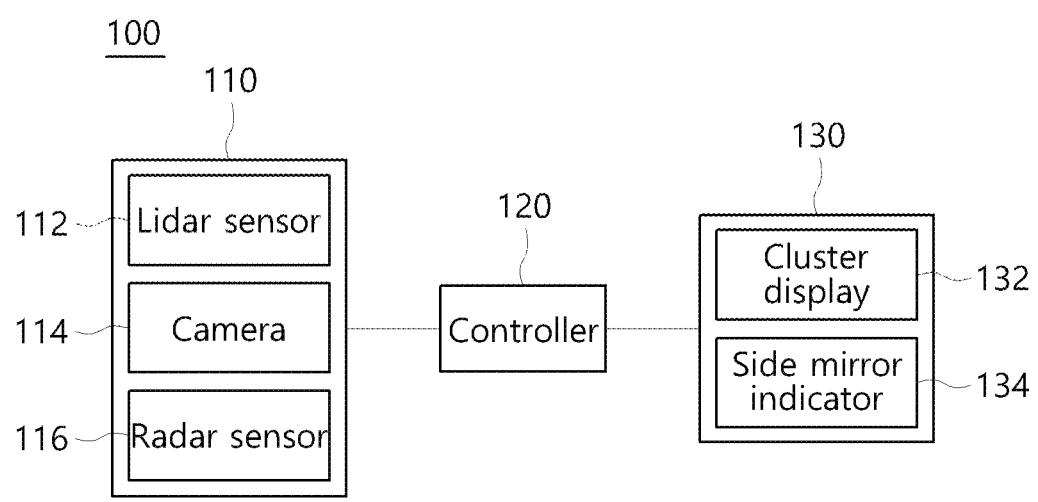
FIG. 1 is a block diagram of a vehicle rear side alarm device according to an exemplary embodiment of the present disclosure.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity. Throughout the specification, like reference numerals denote like elements.

Embodiments of the present disclosure are provided to describe the present disclosure more fully to those skilled in the art, the embodiments described below can be modified into various other forms, and the scope of the present disclosure is not limited to the following embodiments. Rather, these embodiments make the disclosure more meaningful and complete and are provided for fully conveying the concept of the disclosure to those of ordinary skill in the art.

Figure 2:
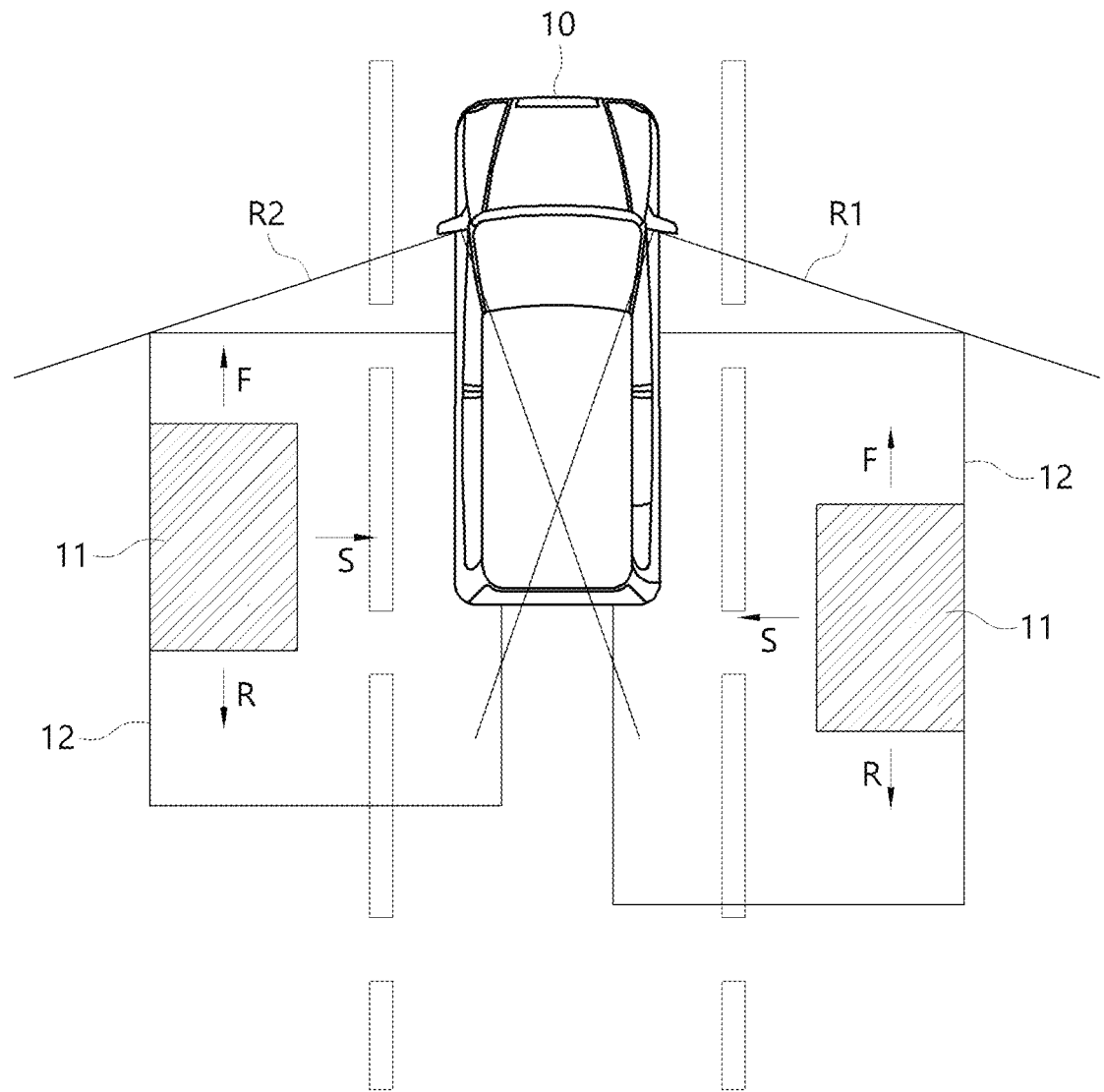
FIG. 2 is an exemplary view showing a detection area of a vehicle rear side alarm device according to an exemplary embodiment of the present disclosure.

FIG. 1 is a block diagram of a vehicle rear side alarm device according to an exemplary embodiment of the present disclosure; and FIG. 2 is an exemplary view showing a detection area of a vehicle rear side alarm device according to an exemplary embodiment of the present disclosure.

Referring to FIG. 1, a vehicle rear side alarm device 100 according to an embodiment of the present disclosure includes a sensor 110, a controller 120, and a display 130.

The sensor 110 may detect around a host vehicle 10. In an example, the sensor 110 may include either a lidar sensor 112 or a radar sensor 116. The lidar sensor 112 or the radar sensor 116 may detect the rear side of the host vehicle 10. Referring to FIG. 2, the lidar sensor 112 or the radar sensor 116 may have detectable areas R1 and R2. In this case, the lidar sensor 112 or the radar sensor 116 may be fitted near the side mirrors of the host vehicle 10.

Here, the lidar sensor 112 or the radar sensor 116 may be set so that the detectable areas R1 and R2 overlap at the rear of the host vehicle 10. In addition, the lidar sensor 112 or the radar sensor 116 may be set to detect at different angles. That is, the detectable areas R1 and R2 may be provided asymmetrically from the left and right sides of the host vehicle 10. Accordingly, the host vehicle 10 may have a first alarm area 11 at different positions from the left and right sides.

The sensor 110 may include a camera 114. Here, the camera 114 may be a rear camera that detects the rear of the host vehicle 10. The camera 114 may be mounted at the center of the tail of the host vehicle 10 or may be mounted at both sides of the tail.

The controller 120 may be communicatively connected to the sensor 110 and the display 130. Here, the controller 120 may be an ECU of the host vehicle 10. Optionally, the controller 120 may be a controller separately equipped for the rear side alarm of the host vehicle 10.

In addition, the controller 120 may be configured to determine whether an object detected by the sensor 110 is a two-wheeled vehicle. In this case, the controller 120 may be configured to distinguish whether the object detected by the sensor 110 is a general four-wheeled vehicle or a narrow-width two-wheeled vehicle by determining a width of the object.

For example, the controller 120 may be configured to determine a strength or amount of a signal received from the lidar sensor 112 or the radar sensor 116. Here, a reflection signal of the lidar sensor 112 or the radar sensor 116 varies depending on the type of vehicle existing behind the host vehicle 10.

A sensing signal of the lidar sensor 112 or the radar sensor 116 has weaker signal intensity for a two-wheeled vehicle than that for a four-wheeled vehicle. In addition, a sensing signal of the lidar sensor 112 or the radar sensor 116 has a smaller amount of signal for a two-wheeled vehicle than that for a four-wheeled vehicle since the two-wheeled vehicle has a smaller reflection area than the four-wheeled vehicle. Therefore, the type of host vehicle 10 may be determined by using the intensity or amount of the sensing signal of the lidar sensor 112 or the radar sensor 116.

In this case, the controller 120 may be configured to determine the object detected by the lidar sensor 112 as a two-wheeled vehicle if the determined intensity or amount of the sensing signal is less than a first threshold value. Here, the first threshold value may be an intensity or amount of a signal detected corresponding to the two-wheeled vehicle.

As another example, the controller 120 may be configured to determine a width of the object detected by the lidar sensor 112. Here, the controller 120 may be configured to determine the width of the object according to the number of points of the lidar sensor 112 for the detected object.

In this case, the controller 120 may be configured to determine the object detected by the lidar sensor 112 as a two-wheeled vehicle if the determined width of the object is less than a second threshold value. Here, the second threshold value may be the number of points corresponding to the two-wheeled vehicle.

As another example, if the sensor 110 includes the camera 114, the controller 120 may be configured to detect an object from an image obtained by the camera 114. Here, the controller 120 may be configured to detect an object using an object detection algorithm.

In addition, the controller 120 may be configured to determine whether the detected object is a two-wheeled vehicle. Here, the controller 120 may be configured to determine whether the object is a two-wheeled vehicle based on an object recognition algorithm.

In addition, the sensor 110 may be a fusion sensor including one of the lidar sensor 112 or the radar sensor 116 and the camera 114.

Accordingly, even when there is an error in detection by the lidar sensor 112 or the radar sensor 116, the vehicle rear side alarm device 100 may determine more accurately whether a two-wheeled vehicle is approaching, by secondary detection using an image from the camera 114.

If an object sensed by the sensor 110 is a two-wheeled vehicle, the controller 120 may be configured to control to primarily alarm the approach of the two-wheeled vehicle through the display 130.

Alternatively, if the sensor 110 includes the camera 114, the controller 120 may be configured to control the display 130 to display an image obtained by the camera 114 if an object detected by the lidar sensor 112 is a two-wheeled vehicle or the object detected from the image obtained by the camera 114 is a two-wheeled vehicle.

In addition, the controller 120 may be configured to secondarily change the alarm area if it determines that a two-wheeled vehicle is in the rear side. That is, the controller 120 may more actively generate an alarm for the two-wheeled vehicle 20 to the driver by expanding the alarm area itself.

More specifically, when detecting a two-wheeled vehicle by the sensor 110, the controller may be configured to set an expanded alarm area (a second alarm area) by expanding a preset alarm area (the first alarm area) to the side of the host vehicle 10.

Referring to FIG. 2, the controller 120 may be configured to expand the first alarm area 11 to the detectable areas R1 and R2 detectable by the lidar sensor 112 or the radar sensor 116. In this case, the controller 120 may be configured to set the second alarm area 12 by expanding the first alarm area 11 to the side S of the host vehicle 10. In addition, the controller 120 may be configured to set the second alarm area 12 by expanding the first alarm area 11 in the forward direction F and the reverse direction R of the host vehicle 10.

Accordingly, the controller 120 may be configured to expand the first alarm area 11 so that the expanded second alarm area 12 partially overlaps the tail of the host vehicle 10.

Accordingly, the vehicle rear side alarm device 100 may perform an alarm for a two-wheeled vehicle 20 capable of running between the host vehicle 10 and the other vehicle 30 in the next lane. Therefore, since the vehicle rear side alarm device 100 can be expand the rear side alarm target to a two-wheeled vehicle, the reliability of the alarm can be improved.

The display 130 may display an object detected by the sensor 110. Here, the display 130 may include at least one of a cluster display 132 and a side mirror indicator 134.

Figure 3:
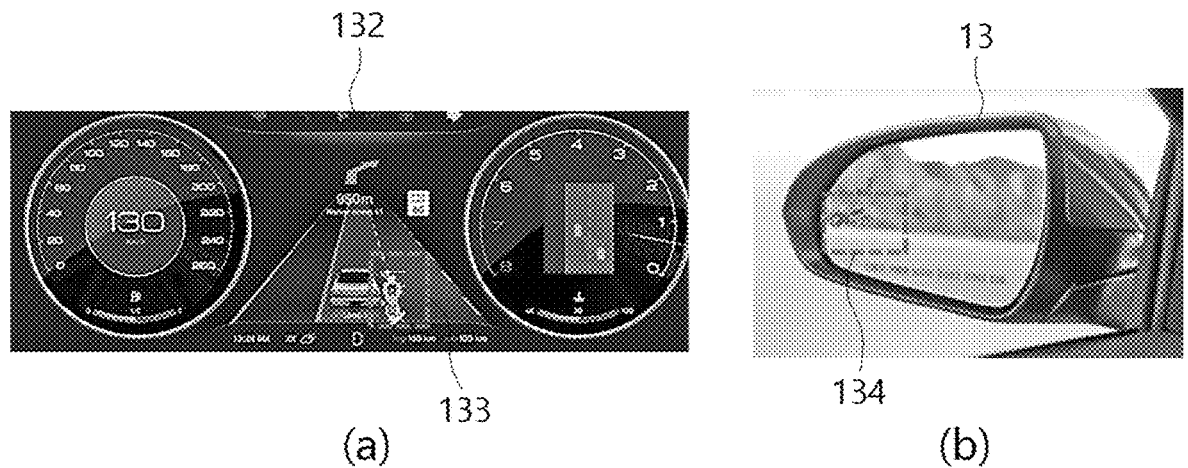
FIG. 3 is an exemplary view showing an example of a display of a vehicle rear side alarm device according to an exemplary embodiment of the present disclosure.
Figure 4:
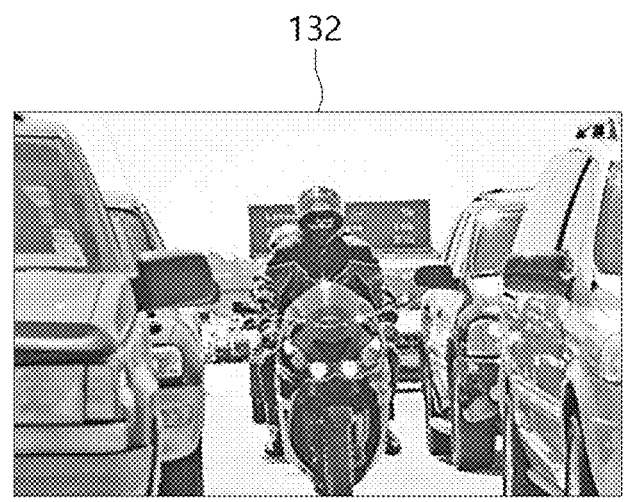
FIG. 4 is an exemplary view showing another example of a display of a vehicle rear side alarm device according to an exemplary embodiment of the present disclosure.

FIG. 3 is an exemplary view showing an example of a display of a vehicle rear side alarm device according to an exemplary embodiment of the present disclosure, and FIG. 4 is an exemplary view showing another example of a display of a vehicle rear side alarm device according to an exemplary embodiment of the present disclosure.

Referring to FIG. 3(a), the display 130 may include a cluster display 132. The cluster display 132 may be configured to perform a rear side alarm so that the driver can recognize it inside the host vehicle 10. In this case, if an object detected by the lidar sensor 112 is a two-wheeled vehicle, the cluster display 132 may be configured to display a symbol 133 corresponding to the two-wheeled vehicle. In addition, the symbol 133 may be flashed by a flashing means so that the driver can easily recognize it.

Referring to FIG. 3(b), the display 130 may include a side mirror indicator 134. The side mirror indicator 134 may be mounted on a side mirror 13 outside the host vehicle 10. In this case, if an object detected by the sensor 110 is a two-wheeled vehicle, the mirror indicator 134 may be configured to display a symbol corresponding to the two-wheeled vehicle. Here, the symbol corresponding to the two-wheeled vehicle may be displayed in a form different from that of an alarm for the first alarm area 11.

Referring to FIG. 4, if the sensor 110 includes the camera 114, the display 130 may display an image obtained by the camera 114. As an example, an image obtained by the camera 114 may be displayed on the cluster display 132.

Accordingly, the driver can directly and easily confirm the approach of a two-wheeled vehicle. Accordingly, the vehicle rear side alarm device 100 can improve the reliability of an alarm for a two-wheeled vehicle.

Figure 5:
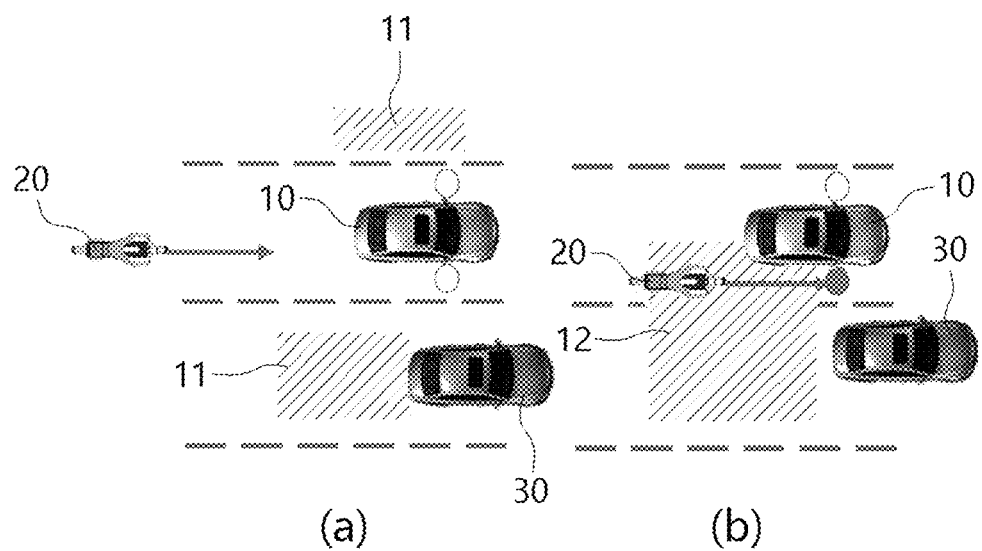
FIG. 5 is an exemplary view showing an alarm area of a vehicle rear side alarm device according to an exemplary embodiment of the present disclosure.

FIG. 5 is an exemplary view showing an alarm area of a vehicle rear side alarm device according to an exemplary embodiment of the present disclosure.

As shown in FIG. 5(a), when a general vehicle is detected, or a two-wheeled vehicle 20 is detected at a long distance from the host vehicle 10, the vehicle rear side alarm device 100 maintains the first alarm area 11. In this case, the first alarm area 11 may be set in a lane area next to the host vehicle 10 in progress.

As shown in FIG. 5(b), when the approach of a two-wheeled vehicle 20 is detected by the sensor 110, the vehicle rear side alarm device 100 may expand the alarm area to the rear of the host vehicle lane and an area between the host vehicle 10 and the host vehicle lane as well as to a lane next to the host vehicle 10 in progress.

Accordingly, the vehicle rear side alarm device 100 may perform an alarm for a two-wheeled vehicle 20 capable of running between the host vehicle 10 and the next lane by using the expanded second alarm area 12. In this case, the vehicle rear side alarm device 100 may generate a rear side alarm by detection of a two-wheeled vehicle 20 even when other vehicle 30 does not exist in the rear side.

As a result, the vehicle rear side alarm device 100 may help the driver to pre-recognize the existence of a two-wheeled vehicle that moves in relatively various paths on the road and is difficult to identify with the naked eyes. Accordingly, since the vehicle rear side alarm device 100 can reduce the possibility of a collision with a two-wheeled vehicle while driving, a collision accident with the two-wheeled vehicle can be prevented in advance.

Hereinafter, a vehicle rear side alarm method of the present disclosure will be described with reference to FIGS. 6 and 8.

Figure 6:
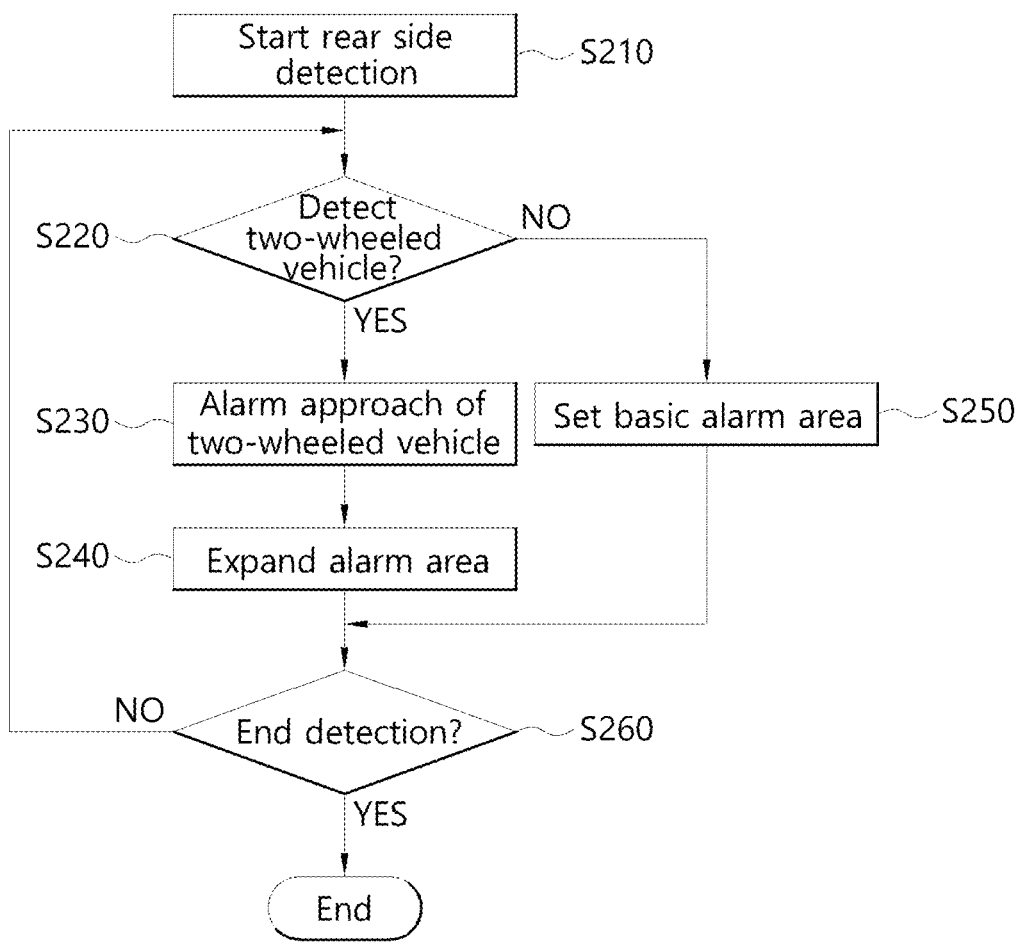
FIG. 6 is a flowchart of a vehicle rear side alarm method according to an exemplary embodiment of the present disclosure.

FIG. 6 is a flowchart of a vehicle rear side alarm method according to an exemplary embodiment of the present disclosure.

Vehicle rear side alarm method 200 includes steps of detecting rear side and detecting a two-wheeled vehicle (S210 and S220), alarming approach of a two-wheeled vehicle (S230), expanding alarm area (S240), and setting basic alarm area and determining whether to end detection (S250 and S260).

In more detail, as shown in FIG. 6, first, the vehicle rear side alarm device 100 detects the rear side of the host vehicle 10 by the sensor 110 at step S210. In this case, the sensor 110 may include either a lidar sensor 112 or a radar sensor 116. Here, the lidar sensor 112 or the radar sensor 116 may be set so that the detectable areas R1 and R2 overlap at the rear of the host vehicle 10.

Next, the vehicle rear side alarm device 100 determines whether an object detected by the sensor 110 is a two-wheeled vehicle at step S220. In this case, the vehicle rear side alarm device 100 may distinguish whether the object detected by the sensor 110 is a general four-wheeled vehicle or a narrow-width two-wheeled vehicle by determining a width of the object. A detailed description will be described later with reference to FIG. 7.

As a result of the determination at step S220, if the object detected by the sensor 110 is a two-wheeled vehicle, the vehicle rear side alarm device 100 alarms the approach of the two-wheeled vehicle through the display 130 at step S230. That is, when detecting a two-wheeled vehicle, the vehicle rear side alarm device 100 may primarily alarm so that the driver can recognize it.

In this case, the vehicle rear side alarm device 100 may display a symbol 133 corresponding to the two-wheeled vehicle through the cluster display 132. Optionally, the vehicle rear side alarm device 100 may display a symbol corresponding to the two-wheeled vehicle through the side mirror indicator 134. Here, the symbol corresponding to the two-wheeled vehicle may be displayed in a form different from that of an alarm for the first alarm area 11.

Alternatively, if the vehicle rear side alarm device 100 includes the camera 114, the vehicle rear side alarm device 100 may display an image obtained by the camera 114 on the display 130.

Next, the vehicle rear side alarm device 100 expand a preset first alarm area 11 to a second alarm area 12 at step S240. In this case, the vehicle rear side alarm device 100 may set the second alarm area 12 by expanding the first alarm area 11 to the side of the host vehicle 10.

Here, the vehicle rear side alarm device 100 may expand the first alarm area 11 so that the expanded alarm area partially overlaps the tail of the host vehicle 10. In this case, the vehicle rear side alarm device 100 may expand the first alarm area 11 to the detectable areas R1 and R2 detectable by the lidar sensor 112 or the radar sensor 116. In addition, the vehicle rear side alarm device 100 may set the second alarm area 12 by expanding the first alarm area 11 in the forward direction F and the reverse direction R of the host vehicle 10.

As a result of the determination at step S220, if the object detected by the sensor 110 is not a two-wheeled vehicle, the vehicle rear side alarm device 100 set a basic alarm area at step S250. That is, when detecting a general four-wheeled vehicle, the vehicle rear side alarm device 100 may detect the rear side of the host vehicle 10 with respect to the first alarm area 11.

Next, the vehicle rear side alarm device 100 determines whether to end detection of the rear side at step S260, and if it is determined not to end detection, may return to step S220 and continuously perform detection of the rear side at steps S220 to S240.

As a result of the determination at step S260, if it is determined to end detection of the rear side, the vehicle rear side alarm device 100 may end a series of rear side detection operations.

Figure 7:
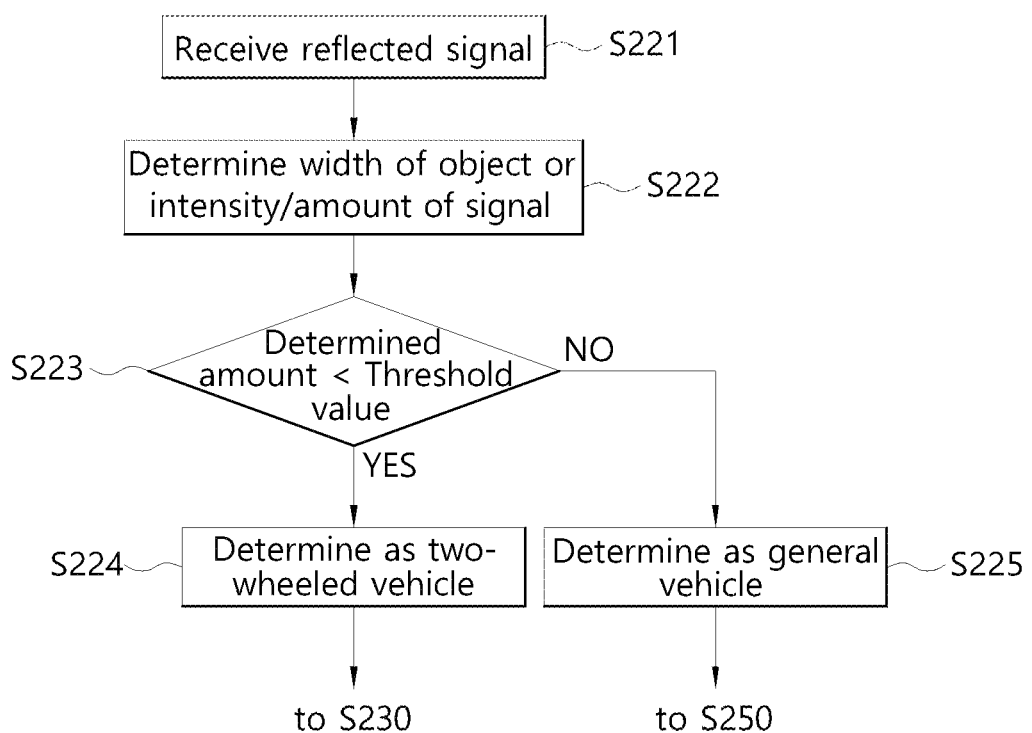
FIG. 7 is a flowchart of a procedure of detecting a two-wheeled vehicle in a vehicle rear side alarm method according to an exemplary embodiment of the present disclosure.

FIG. 7 is a flowchart of a procedure of detecting a two-wheeled vehicle in a vehicle rear side alarm method according to an exemplary embodiment of the present disclosure.

The procedure of detecting a two-wheeled vehicle 220 includes steps of receiving a reflected signal from the lidar sensor 112 or the radar sensor 116 (S221), determining an intensity/amount of the reflected signal (S222), and determining the type of vehicle (S223 to S225).

In more detail, as shown in FIG. 7, first, the vehicle rear side alarm device 100 receives a reflected signal from an object detected by the lidar sensor 112 or the radar sensor 116 at step S221.

Next, the vehicle rear side alarm device 100 determines an intensity or amount of the signal received from the lidar sensor 112 or the radar sensor 116 at step S222.

Alternatively, the vehicle rear side alarm device 100 may determine a width of the object detected by the lidar sensor 112. In this case, the rear side alarm device 100 may determine the width of the object according to the number of points of the lidar sensor 112 for the detected object.

Next, the vehicle rear side alarm device 100 determines whether the amount determined at the step S222 is less than a threshold value at step S223.

As an example, the vehicle rear side alarm device 100 may determine whether the intensity or amount of the received signal is less than a first threshold. Here, the first threshold value may be an intensity or amount of a signal detected corresponding to the two-wheeled vehicle.

Optionally, the vehicle rear side alarm device 100 may determine whether the determined width of the object is less than a second threshold. Here, the second threshold value may be the number of points corresponding to the two-wheeled vehicle.

As a result of the determination at step S223, if the determined intensity or amount of the detected signal is less than the first threshold, the vehicle rear side alarm device 100 determines the object detected by the lidar sensor 112 or radar sensor 116 as a two-wheeled vehicle at step S224. Optionally, if the determined width of the object is less than the second threshold, the vehicle rear side alarm device 100 may determine the object detected by the lidar sensor 112 as a two-wheeled vehicle. In this case, the vehicle rear side alarm device 100 returns to the step of alarming the approach of a two-wheeled vehicle (S230) in FIG. 6.

As a result of the determination at step S223, if the determined intensity or amount of the detected signal is greater than the first threshold, the vehicle rear side alarm device 100 determines the object detected by the lidar sensor 112 or radar sensor 116 as a general vehicle such as a four-wheeled vehicle at step S225. Optionally, if the determined width of the object is greater than the second threshold, the vehicle rear side alarm device 100 may determine the object detected by the lidar sensor 112 as a general vehicle. In this case, the vehicle rear side alarm device 100 returns to the step of setting the basic alarm area (S250) in FIG. 6.

Figure 8:
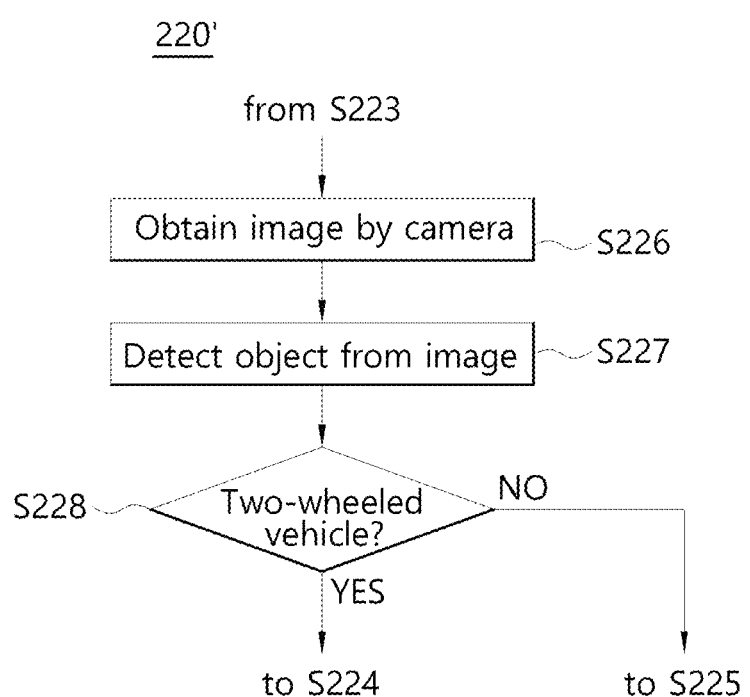
FIG. 8 is a flowchart of a procedure of detecting a two-wheeled vehicle by a camera in a vehicle rear side alarm method according to an exemplary embodiment of the present disclosure.

FIG. 8 is a flowchart of a procedure of detecting a two-wheeled vehicle by a camera in a vehicle rear side alarm method according to an exemplary embodiment of the present disclosure.

The procedure of detecting a two-wheeled vehicle by a camera 220' includes steps of obtaining an image by the camera 114 (S226), detecting an object from the image (S227), and determining whether the detected object is a two-wheeled vehicle (S228).

In more detail, as shown in FIG. 8, first, the vehicle rear side alarm device 100 obtain an image by detecting the rear side of the host vehicle 10 by the camera 114 at step S226. Here, the sensor 110 may be a fusion sensor including one of the lidar sensor 112 or the radar sensor 116 and the camera 114. In this case, if the object detected by the lidar sensor 112 or the radar sensor 116 is a two-wheeled vehicle in FIG. 7 (S223), the vehicle rear side alarm device 100 may further determine whether the vehicle is a two-wheeled vehicle based on information from the camera 114. Alternatively, if the sensor 110 includes only the camera 114, the vehicle rear side alarm device 100 may perform steps S226 and S228 in FIG. 8 instead of steps S221 to S223.

Next, the vehicle rear side alarm device 100 detects an object from the image obtained by the camera 114 at step S227. In this case, the vehicle rear side alarm device 100 may detect the object using an object detection algorithm.

Next, the vehicle rear side alarm device 100 determines whether the detected object is a two-wheeled vehicle at step S228. In this case, the vehicle rear side alarm device 100 may determine whether the object is a two-wheeled vehicle based on an object recognition algorithm.

As a result of the determination at step S228, if the detected object is a two-wheeled vehicle, the vehicle rear side alarm device 100 returns to the step of determining as a two-wheeled vehicle (S224) in FIG. 7.

As a result of the determination at step S228, if the detected object is not a two-wheeled vehicle, the vehicle rear side alarm device 100 returns to the step of determining as a general vehicle (S225) in FIG. 7.

Such methods may be implemented by the vehicle rear side alarm device 100 as shown in FIG. 1, and in particular, may be implemented as a software program that performs such steps, wherein such program may be stored on a computer-readable recording medium or transmitted by a computer data signal combined with a carrier wave in a transmission medium or a communication network. In this case, the computer-readable recording medium may include any kind of recording device in which data readable by a computer system is stored.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

What is claimed is:

1. A vehicle rear side alarm device, comprising:
   a sensor to detect a rear side of a host vehicle;
   a display to display a detected object;
   a controller communicatively connected to the sensor and the display and configured to:
   determine whether the object detected by the sensor is a two-wheeled vehicle;
   in response to determination that the detected object is the two-wheeled vehicle, control to alarm the approach of the two-wheeled vehicle through the display; and
   in response to the determination that the detected object is the two-wheeled vehicle, expand a preset rear side alarm area to the side of the host vehicle so that the expanded alarm area partially overlaps a tail of the host vehicle, wherein the controller is configured to expand the preset rear side alarm area to an area detectable by the sensor in a forward direction and a reverse direction of the host vehicle.

2. The device of claim 1, wherein the sensor comprises at least one of a lidar sensor or a radar sensor; and
   the controller is configured to determine an intensity or amount of a signal received from the lidar sensor or the radar sensor, and if the determined intensity or amount of the signal is less than a first threshold value, determine the detected object as a two-wheeled vehicle.

3. The device of claim 1, wherein the controller is configured to determine a width of the detected object, and if the determined width of the object is less than a second threshold value, determine the detected object as a two-wheeled vehicle.

4. The device of claim 1, wherein the display comprises at least one of a cluster display or a mirror indicator.

5. The device of claim 4, wherein if the detected object is a two-wheeled vehicle, the display displays a symbol corresponding to the two-wheeled vehicle.

6. The device of claim 1, wherein the sensor comprises a camera for detecting rear side of the host vehicle, and
   the controller is configured to detect an object from an image obtained by the camera and determine whether the detected object is a two-wheeled vehicle.

7. The device of claim 6, wherein if the detected object is a two-wheeled vehicle, the controller controls to display the image obtained by the camera on the display.

8. A vehicle rear side alarm method, comprising:
   detecting, by a sensor, rear side of a host vehicle;
   determining whether an object detected by the sensor is a two-wheeled vehicle;
   in response to determination that the detected object is the two-wheeled vehicle, alarming the approach of the two-wheeled vehicle through a display; and
   in response to the determination that the detected object is the two-wheeled vehicle, expanding a preset rear side alarm area to the side of the host vehicle so that the expanded alarm area partially overlaps a tail of the host vehicle, wherein the expanding comprises expanding the preset rear side alarm area to an area detectable by the sensor in a forward direction and a reverse direction of the host vehicle.

9. The method of claim 8, wherein the detecting is performed by one of a lidar sensor or a radar sensor; and
   the determining comprises determining an intensity or amount of a signal received from the lidar sensor or the radar sensor; and if the determined intensity or amount of the object is less than a first threshold value, determining the detected object as a two-wheeled vehicle.

10. The method of claim 8, wherein the determining comprises determining a width of the detected object, and if the determined width of the object is less than a second threshold value, determining the detected object as a two-wheeled vehicle.

11. The method of claim 8, wherein the alarming comprises displaying on at least one of a cluster display or a mirror indicator.

12. The method of claim 11, wherein if the detected object is a two-wheeled vehicle, the alarming comprises displaying a symbol corresponding to the two-wheeled vehicle.

13. The method of claim 8, wherein the detecting comprises detecting rear side of the host vehicle by a camera; and the determining comprises detecting an object from the image, and determining whether the detected object is a two-wheeled vehicle.

14. The method of claim 13, wherein the alarming comprises displaying the image obtained by the camera on the display.

* * * * *